Oct. 17, 1944.  A. HANSEN, JR  2,360,339
STABLE GYROSCOPE ERECTOR
Filed Dec. 19, 1942

Inventor:
Albert Hansen Jr.,
by Harry E. Dunham
His Attorney.

Patented Oct. 17, 1944

2,360,339

UNITED STATES PATENT OFFICE 2,360,339

STABLE GYROSCOPE ERECTOR

Albert Hansen, Jr., Nahant, Mass., assignor to General Electric Company, a corporation of New York Application December 19, 1942, Serial No. 469,536

4 Claims. (Cl. 74—5)

My invention relates to erecting means for gyroscopes and its object is to provide a pendulous erecting device for gyroscopes which is stable.

The axis of rotation of a gyroscope which has its axis of spin normally vertical tends to depart from the vertical when in use and pendulous erecting devices are employed to prevent this from occurring or to restore the spin axis to the vertical upon departures therefrom. The purpose of pendulously supporting the erecting device is so that it will normally remain in the correct erecting position with respect to the vertical axis of spin of the gyroscope. When such a gyroscope is mounted on an airplane, at times acceleration forces occur which cause the pendulous erecting means to depart from a true pendulum position. It should be restored to such a position as soon as possible since when in other than a correct position it produces erroneous erection. It has been found that pendulous erecting devices of the prior art, due to the usual nature of their suspension and the erroneous erecting forces which occur when the erecting device is in other than a correct position, are slow to return to a correct position and in some cases self-sustaining pendulum oscillations are set up which increase in violence to a point where they upset the gyroscope.

Such pendulous erecting devices have normally horizontal pivoted gimbal rings or the equivalent with the two pivoted axes at right angles to each other so as to obtain the effect of a universal pendulum mounting. I have discovered that the unstability previously noted is most pronounced when the natural period of oscillation about the two axes is nearly the same but that if the period about one axis be made about half of that about the other axis the difficulty disappears and the forces which added to sustain oscillation in the former case now sufficiently oppose each other to damp out oscillations and quickly restore the erecting device to normal position.

Figure 1:
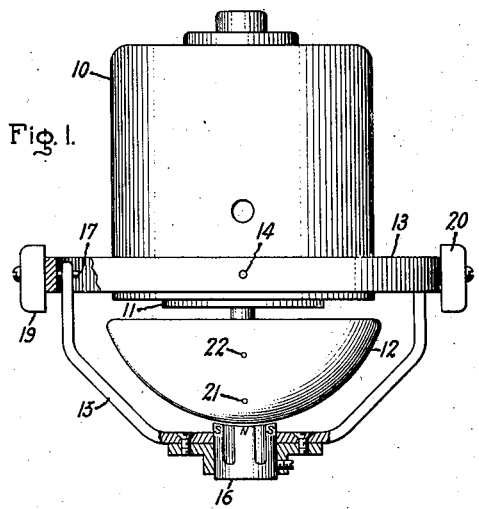
Figure 1A:
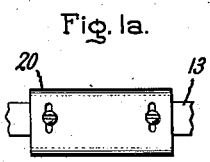
Figure 2:
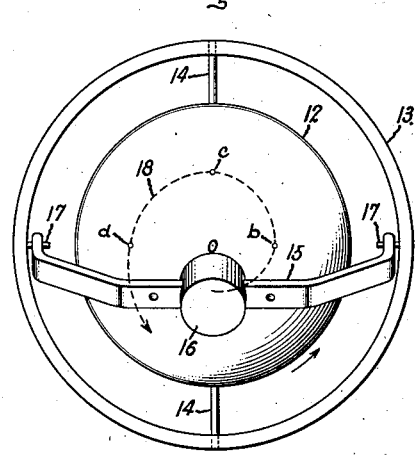
Figure 3:
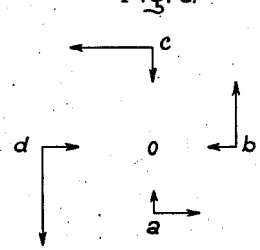
Figure 4:
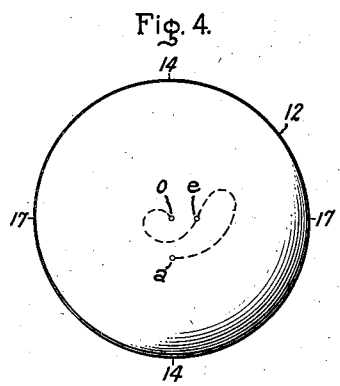
Figure 5:
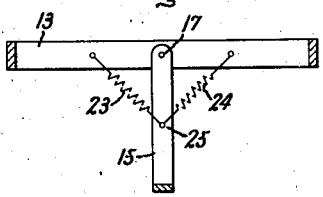

The features of my invention which are believed to be novel and patentable will be pointed out in the claims appended hereto. For a better understanding of my invention reference is made in the following description to the accompanying drawing in which Fig. 1 represents one embodiment of my invention where the desired periods of oscillation of the erecting device about its two axes is obtained by weights and Fig. 5 shows how the same result may be obtained by springs. Fig. 1a is a detail side view of Fig. 1; Fig. 2 is a bottom view of an erecting device explanatory of a self-sustaining oscillation condition; Fig. 3 illustrates the forces which occur in the device of Fig. 2; and Fig. 4 illustrates how such forces may be made to oppose each other and are damped out.

In Fig. 1, 10 represents a gyroscope casing and 11 the rotor of the gyroscope. The supporting gimbal ring arrangement for the gyroscope has not been shown as it is not involved in the invention but it may be assumed that the gyroscope casing is mounted supported so that it can maintain its spin axis vertical as represented. The rotor 11 drives a bowl-shaped conductor member 12 comprising the rotating part of the erecting device. A gimbal ring 13 is pivoted to the gyroscope casing or otherwise on horizontal pivots at right angles to the plane of the drawing, one pivot being shown at 14. A support 15 for the erecting magnet 16 is pivoted to gimbal ring 13 on a horizontal axis at right angles to the axis of pivot 14. These axes of suspension intersect. One of the pivots for support 15 is shown at 17. 16 may be a permanent magnet structure with alternate N and S poles arranged in symmetrical circular formation, and facing the conductor 12 and producing a flux therein. An erecting device of this general character is the subject matter of British Patent 359,071 and the details thereof are unimportant so far as the present invention is concerned and my invention may be used with other forms of erecting devices having a part which is supported as a universal pendulum and is acted on by tangential force when displaced from a center position.

It is evident that should the gyro casing 10 or other support for gimbal ring 13 be tipped in any direction the magnet 16 will, due to its universal pendulum support, remain with its center of gravity in the lowest position or the axis of magnet 16 will remain vertical under normal conditions. The purpose of the magnet 16 and rotating conductor 12 is to produce an eddy current erecting force on the gyroscope in case the spin axis of the gyroscope departs from the vertical. If, however, the pendulous magnet is held or swings away from the true pendulum or vertical position, the erecting force exerted on the gyroscope is erroneous, that is, it becomes a de-erecting instead of an erecting force.

When mounted on an airplane the erecting magnet 16 does not always maintain the true vertical position but is caused to swing from the vertical due to quick acceleration or turning movements of the airplane. When this happens the magnet 16 should return to correct position as soon as possible.

As usually constructed, however, such pendulous erecting devices of the prior art have been unstable when moved from true position, which is generally evidenced by a circular oscillatory movement which is self-sustaining in various degrees. I have discovered the cause of this instability and the way to overcome the same, as will now be explained.

In Fig. 2 I have represented a bottom view of a portion of the erecting parts of Fig. 1 with the magnet 16 and its pivoted support ball 15 represented as swung from the correct position around the axis of pivots 17. The conductor cup 12 is assumed to be in rotation in the counterclockwise direction as represented in Fig. 2. Now, when the magnet is moved off-center to the position shown, there is an eddy current damping force which tends to drag the magnet along with the cup 12 and swing the pendulum to the right about the axis of pivots 14. I have found that if the natural period of oscillation of magnet 16 is nearly the same about both axes, 14 and 17, the magnet will move in a gradually increasing spiral path represented by dotted line arrow 18 and that this circular oscillation is self-sustaining and that the oscillations may become so violent as to upset the gyroscope.

The magnet 16 in Fig. 2, in the position shown, which I will designate position a, is acted upon by two forces, one of which is the force of gravity tending to return the pendulum to center position about axis 17—17 and the other a drag magnet force tending to swing the pendulum to the right about the axis 14—14. It thus moves to some such position b where it is acted upon by the same forces of increased value and in a different direction. The drag force is now such as to swing the magnet upward in Fig. 2 about axis 17—17 and this, together with the momentum of the oscillation of the pendulum about such axis in passing through the mid point 0 of its swing augments the oscillation. The force of gravity at point b is of course towards the mid point 0. The resultant of these forces carries the magnet to point c and then to d, etc., in a gradually increasing spiral. These forces are represented in Fig. 3. This will occur when the natural periods of oscillation about the 17—17 and 14—14 axes are the same or approximately the same and represents an unstable condition.

If, however, the natural period of oscillation about the 17—17 axis be made about one-half the natural period of oscillation about the 14—14 axis, or vice versa, the path of travel of the magnet, starting from the same point a, may be represented about as in Fig. 4. Now, because the magnet tends to oscillate about the 17—17 axis in about one-half the period of oscillation about the 14—14 axis it performs a sort of a figure eight loop so that its momentum force becomes opposed to the drag force at from about point e, Fig. 4, and from then on until the left hand portion of the loop is about completed the oscillation momentum or moment of inertia of the magnet about both axes is opposed to and is damped by the drag force. Thus, the oscillations are damped out and the magnet quickly returns to mid position and stops oscillating. This represents the ideal condition. There are, of course, a variety of other possible conditions between the two conditions discussed. The gravity and drag forces influencing oscillation become zero at the mid position.

Bearing friction and the character of the drag magnet forces at different distances from the zero or mid position of the pendulum may alter the conditions somewhat from those represented. In general, pendulous erecting devices which have natural periods of oscillation about the two axes which are fairly close together will be unstable. To assure stability it is not essential that the period of oscillation about one axis be exactly one-half that about the other axis because bearing friction which is always present in some degree will assist stabilization. In Fig. 1 the gimbal ring 13 is provided with weights 19 and 20. The unstable condition discussed in connection with Fig. 3 may be assumed to have occurred with the erecting device of Fig. 1 with the weights 19 and 20 removed. Consider the parts pivoted on axis 17—17 as one pendulum and assume that its center of mass is at the point designated n of magnet 16. Consider the parts pivoted on axis 14—14 less weights 19 and 20 but including the first mentioned pendulum as a second pendulum having its center of mass at point 21. These two pendulums have lengths and natural periods of vibration which are sufficiently alike as to cause instability although not quite so bad a case as was discussed in connection with Fig. 3 where the periods were assumed to be equal. By adding the weights 19 I raise the center of mass of the pendulum pivoted on axis 14—14 to point 22. These weights may be secured to gimbal ring 13 by screws as represented in Fig. 1a and their exact up and down position may be adjustable as indicated, although the exact position is not critical. Now, the periods of the two assumed pendulums are sufficiently different that we have a self-damping arrangement such as discussed in connection with Fig. 4, and as thus damped, Fig. 1 represents one embodiment of my invention. In this case the natural period of oscillation of the pendulum pivoted on axis 14 was increased by shortening its length without changing the other pendulum.

Instead of changing the period of the main pendulum pivoted on axis 14, I may in effect increase the natural period of the pendulum pivoted on axis 17 by means of resilient springs, as shown in Fig. 5. Here springs 23 and 24 are provided tensioned between a point 25 on the ball 15 and points on gimbal ring 13 equally distant from pivot 17. Such springs will preferably be provided adjacent both pivots 17 in order to obtain a symmetrical balanced arrangement. Such springs bias the ball 15 to its normal position at right angles to the plane of the gimbal ring 13 but allows it to oscillate from such position and thus has the same effect as decreasing the length of the pendulum part 13—16 or increasing its natural period of vibration. In this modification the pendulum pivoted on axis 14 may have its center of mass at 21, Fig. 1, while the pendulum pivoted on axis 17 will have a period of vibration similar to that of a pendulum with its center of mass at about point 22, but such period being obtained largely by the application of resilient vibratory forces of the correct amount.

What I claim as new and desire to secure by Letters Patent of the United States is:

1. In combination with a gyroscope of the vertical spin axis type, an erecting device therefor comprising a part which is symmetrical with the spin axis of the gyroscope and is rotated by the gyroscope and a pendulum part which is suspended relative to the gyroscope on two horizontal axes at right angles to each other so as to have a normal position of rest symmetrical with the axis of spin of the gyroscope when the latter is correct, the rotating part of said erecting device having a surface adjacent to which the pendulum part may swing, said parts normally cooperating to produce a retarding force on said rotating part and an erecting force on the gyroscope when its spin axis departs from correct position, said pendulum part having a natural period of oscillation about one horizontal axis which is of the order of one-half the natural period of oscillation about the other horizontal axis for the purpose of stabilizing said pendulum part.

2. In combination with a gyroscope of the vertical spin axis type, an erecting device therefor comprising conductor and magnet parts, one being mounted symmetrically with respect to the spin axis of the gyroscope and rotated by the gyroscope and the other being mounted as a pendulum with respect to the gyroscope on horizontal axes which are at right angles to each other so as to have a normal position of rest symmetrical to the spin axis of the gyroscope adjacent to the other part, that part of the erecting device which is mounted as a pendulum having a natural period of oscillation about one horizontal axis which is approximately twice the natural period of its oscillation about the other horizontal axis for the purpose of suppressing torsional pendulum oscillations thereof.

3. In combination with a gyroscope of the vertical spin axis type, an erecting device therefor including a part which is mounted as a universal pendulum with respect to the gyroscope, such mounting comprising a gimbal ring pivoted on a first normally horizontal axis and a bail supporting said part pivoted to said gimbal ring on a second normally horizontal axis at right angles to the first-mentioned axis and intersecting the same, the distance from the center of mass of the height thus pivoted about the first-mentioned axis to the point of intersection of axis being approximately one-half of the distance from such point of intersection to the center of mass of the weight pivoted about the second mentioned axis, said weight distribution arrangement being for the purpose of stabilizing the pendulous movements of said erecting device part.

4. In combination with a gyroscope of the vertical spin axis type, an erecting device therefor including a part which is mounted with respect to the gyroscope as a universal pendulum, the mounting of said part comprising a gimbal ring pivoted on a normally horizontal axis and a bail supporting said part pivoted to the gimbal ring on a normally horizontal axis at right angles to the first mentioned axis and intersecting the same, and means between said gimbal ring and bail resiliently biasing said bail to a position where it extends at right angles to the plane of the gimbal ring but allowing it to oscillate to and from such position, said arrangement serving to make the period of oscillation of the pendulous supported part about one axis about one-half its period of oscillation about the other axis.

ALBERT HANSEN, Jr.

CERTIFICATE OF CORRECTION.

Patent No. 2,360,339. October 17, 1944.

ALBERT HANSEN, JR.

It is hereby certified that error appears in the printed specification of the above numbered patent requiring correction as follows: Page 1, first column, line 10, after the word "therefrom" insert a period; page 3, second column, line 9, claim 3, for "height" read --weight--; and that the said Letters Patent should be read with this correction therein that the same may conform to the record of the case in the Patent Office.

Signed and sealed this 2nd day of January, A. D. 1945.

Leslie Frazer (Seal) Acting Commissioner of Patents.